(12) United States Patent
Louwsma et al.

(10) Patent No.: US 8,300,161 B2
(45) Date of Patent: Oct. 30, 2012

(54) REDUCTION OF CROSS-TALK FOR A DUAL VIEW DISPLAY DEVICE

(75) Inventors: Hendrik Louwsma, Heerlen (NL); Chia-Yi Tsai, Yilan (TW); Yao-Jen Chang, Miaoli (TW)

(73) Assignee: Chimei Innolux Corporation, Miao-Li County (TW)

( * ) Notice: Subject to any disclaimer, the term of this patent is extended or adjusted under 35 U.S.C. 154(b) by 1412 days.

(21) Appl. No.: 11/695,385

(22) Filed: Apr. 2, 2007

(65) Prior Publication Data
US 2008/0137003 A1      Jun. 12, 2008

Related U.S. Application Data

(63) Continuation-in-part of application No. 11/609,404, filed on Dec. 12, 2006, now Pat. No. 7,834,943.

(51) Int. Cl.
*G02F 1/1335* (2006.01)
*G02F 1/1333* (2006.01)

(52) U.S. Cl. ............................. 349/15; 349/106; 349/110

(58) Field of Classification Search .................... 349/15, 349/106, 110
See application file for complete search history.

(56) References Cited

U.S. PATENT DOCUMENTS

| 6,445,406 | B1 * | 9/2002 | Taniguchi et al. | 348/51 |
| 6,597,420 | B2 * | 7/2003 | Kim et al. | 349/106 |
| 2003/0090608 | A1 * | 5/2003 | Kim et al. | 349/110 |
| 2008/0278640 | A1 * | 11/2008 | Ijzerman et al. | 349/15 |

* cited by examiner

*Primary Examiner* — Mark Robinson
*Assistant Examiner* — Charles Chang
(74) *Attorney, Agent, or Firm* — Thomas|Kayden

(57) ABSTRACT

Display devices for displaying a first and second view are provided. A representative display device includes a color generating layer (CF) and an array layer (AR). The color generating layer incorporates a plurality of color elements arranged in a two-dimensional array extending in a plurality of rows in a horizontal direction (X) and a plurality of columns in a vertical direction (Y). The array layer includes array metal circuitry covering a portion of each of the color elements. The color generating layer includes means for preventing light generated for one of the first and second views from being transmitted by reflection by at least a portion of a surface of the array metal circuitry in a direction of the other of the first and second views.

18 Claims, 4 Drawing Sheets

REDUCTION OF CROSS-TALK FOR A DUAL VIEW DISPLAY DEVICE

CROSS REFERENCE TO RELATED APPLICATION

This application is a Continuation-in-Part of U.S. patent application Ser. No. 11/609,404, entitled "Reduction of Cross-Talk in Vertical Direction for Dual-View Display Devices," filed on Dec. 12, 2006, which is incorporated by reference herein.

FIELD

The present invention relates to Dual View display devices.

BACKGROUND

Pixel matrix display devices are known in the field. Typically, a pixel matrix device comprises a number of pixel elements arranged in an orthogonal matrix formation. Each pixel element may be controlled individually to be illuminated or not. By selectively controlling each pixel, an image may be created.

A flat panel display such as an LC (liquid crystal) pixel matrix display or an OLED (organic light emitting diode) pixel matrix display can function as a Dual View display, in which in a horizontal direction a first view can be generated along a first range of viewing angles and a second view can be generated along a second range of viewing angles. Such a Dual View display is capable of generating two different views at the same time by assigning one half of the pixels of the pixel matrix to the first view and another half of the pixels of the pixel matrix to the second view.

The Dual View display type is for example used in automotive applications as a display which can be used simultaneously by a driver and a passenger. The driver will see the first view, which for example shows a display that relates to parameters of the automobile such as a route navigation display. The passenger may see a second view, for example a TV broadcast or a video.

Typically, such a Dual View display device comprises a light source such as a backlight, a first and second polarizer, a single barrier, a color filter plate and an array plate. In this regard, FIG. 1 schematically depicts a cross-section of a prior art Dual View display using a single barrier. The cross-section shown here is taken along a horizontal direction X of the Dual View display.

On top of the backlight BL, the first polarizer P1, the single barrier SB, the color filter plate (or color generating layer) CF, the array plate (or array layer) AR and the second polarizer P2 are stacked in that order. The first polarizer P1 is arranged for providing light emitted from the backlight BL with a given polarization state. The color filter plate CF comprises a two dimensional matrix of transparent color elements on a color filter glass substrate. The color elements comprise red elements R, green elements G and blue elements B, which are configured to generate light of a red color (R), green color (G) or blue color (B) respectively, when, during use, light from the backlight BL passes through the respective color element. The array plate AR, which comprises an array glass substrate, is arranged next to the color filter plate CF. In between the array plate AR and the color filter plate, a layer of light switching elements is arranged. Each light switching element corresponds one-to-one with one color element in the color filter plate. The array plate comprises array metals M (i.e., metallic connection line and/or metallic light shield) which are arranged for connecting to the light switching elements.

It is noted that alternative Dual View display devices are known in which the array plate AR may be located between the color filter plate CF and the single barrier SB. Also, it is conceivable that the single barrier SB is located as a front barrier on a front side of the display (i.e., the side where images/views generated by the display are viewable by an observer).

Typically, each light switching element comprises a layer of liquid crystal material and a thin film driver circuit for controlling the state of the liquid crystal layer. Such a thin film driver circuit typically comprises components as a thin film transistor, a thin film storage capacitor, and one or more contacts. Further, the thin film driver circuit comprises thin film metallization for suitably connecting these components of the driver circuit.

Under control of an electric signal, the driver circuit of a light switching element is configured to set the liquid crystal layer of the light switching element to either an opaque state or a transparent state or to one or more intermediate semi-transparent states. Finally, the second polarizer P2 is arranged for providing the light that was transmitted through the array plate with a second given polarization state.

The single barrier SB within the Dual View display device, which may include a barrier glass substrate on which a barrier pattern of openings O in an otherwise opaque barrier layer BS, is provided. The barrier pattern is configured for directing light in such a way that two views can be obtained in conjunction with assigning one half of the pixels of the pixel matrix to the first view and another half of the pixels of the pixel matrix to the second view.

It is known that in the Dual View display as described above, cross-talk between the two views can occur for various reasons. Due to an overlap a of the viewing angles of the two views, a cross-talk can occur which mainly is visible at the overlapping viewing angle range.

Another type of cross-talk can occur due to internal reflection within the stack of the backlight BL, the first polarizer P1, the single barrier SB, the color filter CF, the array plate AR and the second polarizer P2. Typically, such cross-talk may be visible over the fall viewing angle of either one of the first and second views.

SUMMARY OF THE INVENTION

The present invention relates to display devices for displaying a first view and a second view. In an embodiment, the first view and the second view have a first and second horizontal viewing angle, respectively; the display device comprising a color generating layer, a barrier layer, an array layer and a light source; the color generating layer comprising a plurality of color elements arranged in a two-dimensional array extending in a plurality of rows in a horizontal direction and a plurality of columns in a vertical direction; the light source being arranged such that, during use, light generated by the light source may pass through an arrangement of at least the barrier layer and the color elements of the color generating layer; the array layer comprising array metal circuitry; the array metal circuitry in a projection covering a portion of each color element; the color generating layer comprising light blocking elements for preventing light, generated for one of the first and second views, from being transmitted by reflection on at least a portion of a surface of the array metal circuitry in a direction of the other of the first and second views.

Another embodiment of a display device includes a color generating layer (CF) and an array layer (AR). The color generating layer incorporates a plurality of color elements arranged in a two-dimensional array extending in a plurality of rows in a horizontal direction (X) and a plurality of columns in a vertical direction (Y). The array layer includes array metal circuitry covering a portion of each of the color elements. The color generating layer includes means for preventing light generated for one of the first and second views from being transmitted by reflection by at least a portion of a surface of the array metal circuitry in a direction of the other of the first and second views.

The present invention also relates to methods for manufacturing a display device for displaying a first view and a second view, the first view and the second view having a respective horizontal viewing angle. In one embodiment, the method comprises: providing a color generating layer, a barrier layer, an array layer and a light source; the color generating layer comprising a plurality of color elements arranged in a two-dimensional array extending in a plurality of rows in a horizontal direction and a plurality of columns in a vertical direction; arranging the light source in such a way that, during use, light generated by the light source may pass through an arrangement of at least the barrier layer and the color elements of the color generating layer; arranging the array layer with array metal circuitry, the array metal circuitry in a projection covering a portion of each color element; arranging the color generating layer with light blocking elements that prevent light generated for one of the first and second views from being transmitted by reflection on at least a portion of a surface of the array metal circuitry in a direction of the other of the first and second views.

BRIEF DESCRIPTION OF DRAWINGS

Below, the invention will be explained with reference to the drawings, which are intended for illustration purposes only and not to limit the scope of protection which is defined in the accompanying claims.

DETAILED DESCRIPTION

Figure 2:
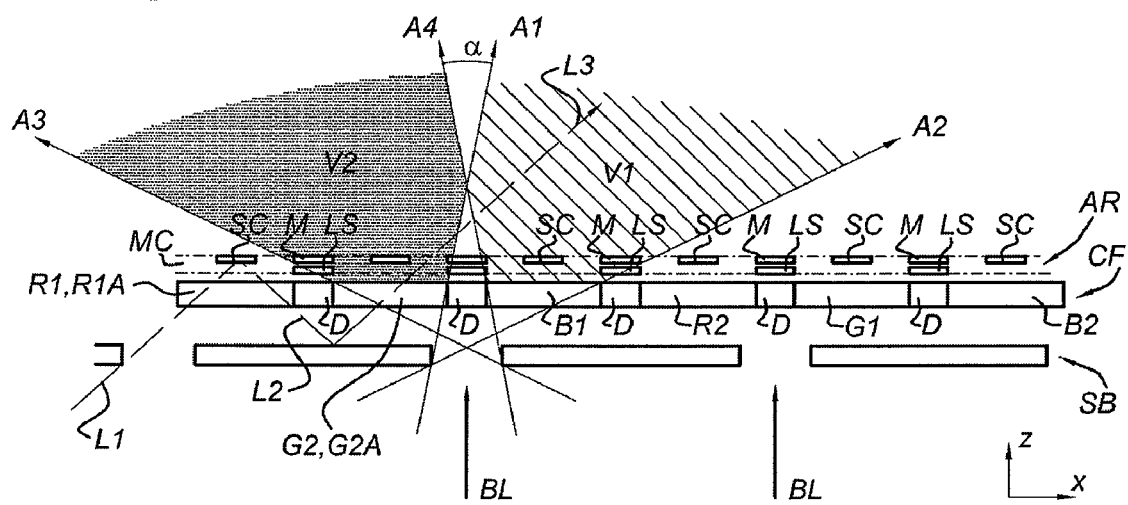
FIG. 2 depicts the cross-section of the prior art Dual View display to explain cross-talk due to overlapping viewing angles of the two views and to internal reflections.

FIG. 2 depicts the cross-section of a prior art Dual View display to explain cross-talk due to overlapping viewing angles of the two views and to internal reflections. In FIG. 2, color elements indicated by R1, G1, B1 are dedicated to the first view, while color elements indicated by R2, G2, B2 are dedicated to the second view. Note that due to the geometry of the barrier and the required views, pixels are paired in an interleaved order. In FIG. 2, red color element R1 for the first view is adjacent to green element G2 for the second view. Green element G2 is next to blue element B1 for the first view. The blue element B1 is next to red element R2 for the second view V2. The red color element R2 for the second view is adjacent to green element G1 for the first view. Green element G1 is next to blue element B2 for the second view. Blue element B2 is next to a next red element R1 for the first view V1. This pattern R1-G2-B1-R2-G1-B2 is repeated along the direction X.

Adjacent color elements may exhibit an element misfit D such as an element gap or an element overlap between them that is technology related. Typically, such an element misfit D may be in the order of about 1 µm-about 3 µm.

In addition to the metallic connection lines M, each light switching element comprises driving components MC of the thin film driver circuit. Typically, the driving components are metallic and relate to a storage capacitor, one or more contacts and connecting lines to the thin film transistor (a gate line, not shown) or connecting lines to the storage capacitor or the contact(s) of the light switching element.

As illustrated by arrows A1, A2, color element B1 contributes to the first view under first viewing angle V1. The color element R2 adjacent to B1 contributes to the second view under second viewing angle V2 as illustrated by arrows A3, A4.

Please note that either a gap or an overlap OV, may occur between the viewing angles V1 and V2 (between arrow A2 and arrow A3) depending on the actual design of the single barrier. In case of the occurrence of an overlap OV, cross-talk between the first and second view exists at the overlapping boundaries of the two views.

Cross-talk due to internal reflections is schematically indicated by the optical path shown by arrows L1, L2, L3, which represent light (a light ray L1) generated by the backlight, that is transmitted through a first color element (in this example R1a). After passing the first color element R1a, the light ray (partially or fully) reflects at a surface of a driver component MC as a first reflected light ray L2 and again passes the first color element R1a in a direction towards the backlight. Next, the reflected light ray L2 impinges on the surface of a blocking structure BS of the single barrier SB (or on an interface between the color filter CF and the single barrier SB), and reflects (partially or fully) as second reflected light ray L3 at that interface. Finally, the second reflected light ray L3 is transmitted in a direction away from the backlight BL and passes a second color element G2a, adjacent to the first color element R1a.

As a consequence of internal reflections, light that was transmitted to pass a color element associated with one view (in this case color element R1a of the first view V1), is also partially transmitted through an adjacent color element associated with the other view (color element G2a of the second view V2). In this manner, a cross-talk between the first and second view may be generated, since the light transmitted through the second color element G2a is directed in a direction within the view angle range A1, A2 of the first view V1. It should also be noted that, due to design of a display device, such cross-talk by internal reflection can occur throughout the full viewing angle of each of the views.

Figure 1:
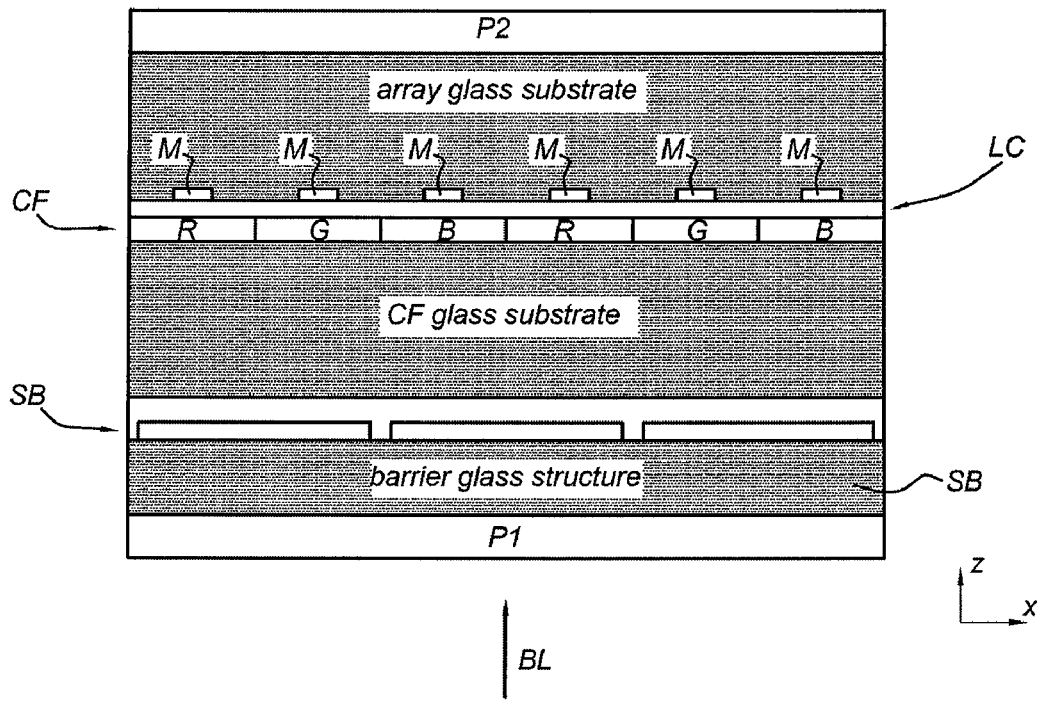
FIG. 1 depicts a cross-section of a prior art Dual View display using single barrier technology.
Figure 3:
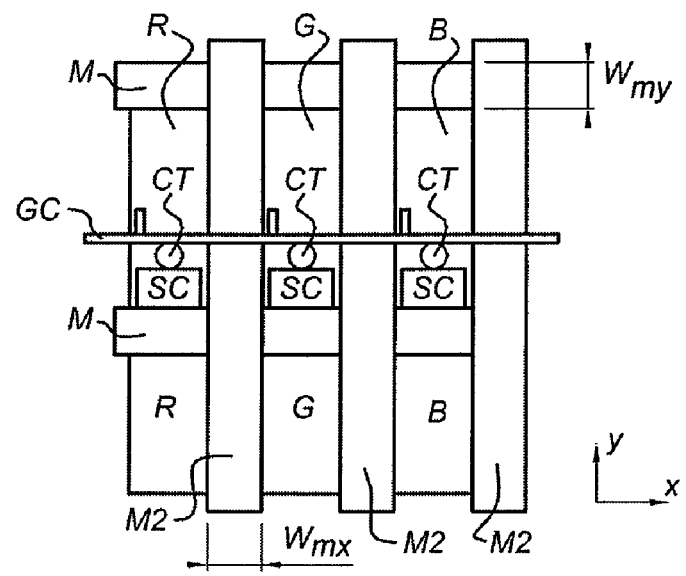
FIG. 3 shows the cross-section of the prior art Dual View display of FIG. 2 in more detail.

FIG. 3 shows a front view of an exemplary display as shown in FIGS. 1 and 2. In FIG. 3, a portion of the color filter plate CF is shown with the light switching layer or liquid crystal layer and array plate superimposed. Note, the red color element R is adjacent in the horizontal direction X to the green element G, and the green element is next to the blue element B.

In the vertical direction Y, the color elements may be arranged in color stripes, i.e., in a column all color elements have the same color. In the vertical direction, the red, green and blue elements are (in a projection of the array plate on the color filter plate) separated by the horizontal metal connection lines M. In the horizontal direction X, each color element is separated from vertically adjacent color elements by a vertical metal connection line M2. Note that, next to each horizontal line M may run a gate control line GC.

On a portion of each color element R, G, B, an array metal structure is located that relates to driving components of the TFT driver circuit that may comprise a transistor (not shown), a storage capacitor SC, and a contact CT to a transparent conductive (e.g. ITO) pixel layer. The transistor comprises a gate, a source and drain (not shown). The transistor is arranged for controlling the state of the LC layer as described above. Note that the LC layer per se is not shown.

Due to the arrangement of metal connection lines M2, M and, depending on the design, gate control lines GC on the array plate AR next to the color filter plate CF a matrix of TFT circuits is created, wherein each TFT circuit may be selectively controlled to address the corresponding sub-pixel. It is noted that the shown arrangement of array metals is an example. Depending on the design of the TFT circuit (also referred to as array design or pixel design) the arrangement of array metals may be different, as will be appreciated by persons skilled in the art.

From FIG. 3, it can be derived that a portion of the surface of each color element is covered by some metallic driver components and/or metallic connection lines and/or light shields. In practice, it is observed that up to about 40% of an area of one color element (or sub-pixel) may be a reflective area due to coverage by array metal.

Figure 4:
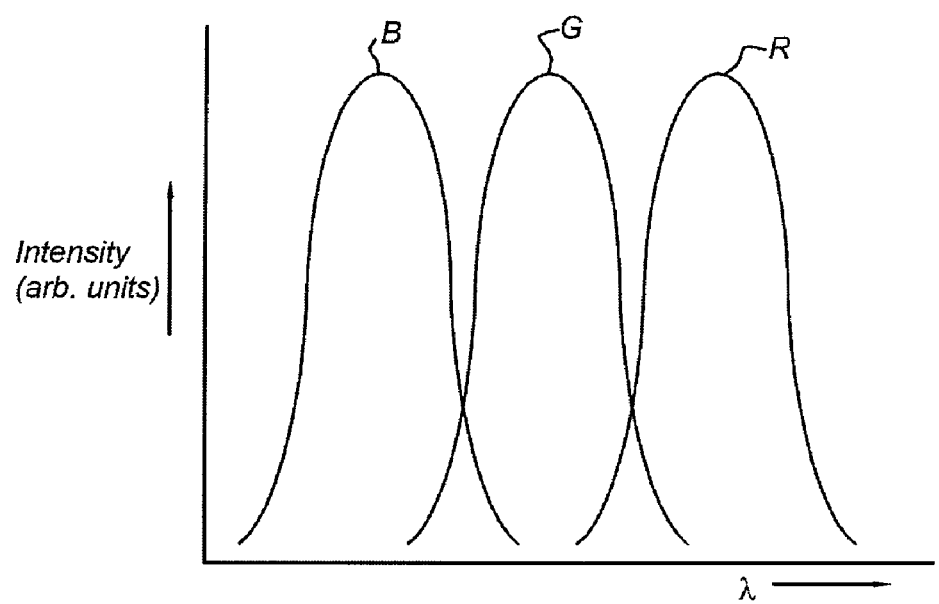
FIG. 4 shows a detailed top view of a thin film driver circuit from the prior art.

FIG. 4 shows a color spectrum of color filter plate color elements. In FIG. 4, the color spectrum is shown for a color filter that includes red, green and blue color elements. The intensity of each color R, G, B is plotted (in arbitrary units) along the vertical axis as a function of wavelength along the horizontal axis.

In relation to cross-talk that involves transmission of light through a first color element of one view and through a second adjacent color element of the other view, it can be concluded that such transmitted light is relatively attenuated. First, the light of the backlight (white spectrum) is transmitted through the first color element of one view. After passing the first color element of the one view, the transmitted light has a spectrum associated with that of the first color element. Then, after reflection, the light with the spectrum associated with the first color element passes through the second color element of the other view. As a result of the small spectral overlap of red R, green G and blue B, the intensity of the component in the light that is allowed to pass the second color element of light will be low. Accordingly, the intensity of the cross-talk may already be reduced.

Note that this attenuation by light passing two adjacent first and second color elements occurs only if the color filter plate is located between the backlight BL and the array plate AR. In the case where the array plate AR is between the color filter plate and the backlight, the light travels from the backlight to the array metal at the array plate, reflects without a change of color, and then travels to the barrier layer SB. Thus, the reflected light is not attenuated by the color elements.

From FIG. 4, it can further be derived that red R and blue B have only a relatively small overlap of wavelength of their respective intensity curves, while red R and green G or green G and blue B have relatively larger overlap of wavelength.

Taking into account the higher sensibility of the human eye for green G in comparison to red R and blue B, the overlap between green G and blue B is relatively strongly perceived by the human eye and cross-talk from green G to blue B is relatively largest between the first and second views V1, V2. Since the human eye has the relatively lowest sensibility for blue color, cross-talk of other colors (different from blue) from one view in blue portions of the other view is most noticeable for the human eye. It is recognized, therefore, that the arrangement of a dual view display in which the color filter plate CF is located between the array plate AR and the backlight BL has an advantage to reduce cross-talk due to internal reflection.

Figure 5:
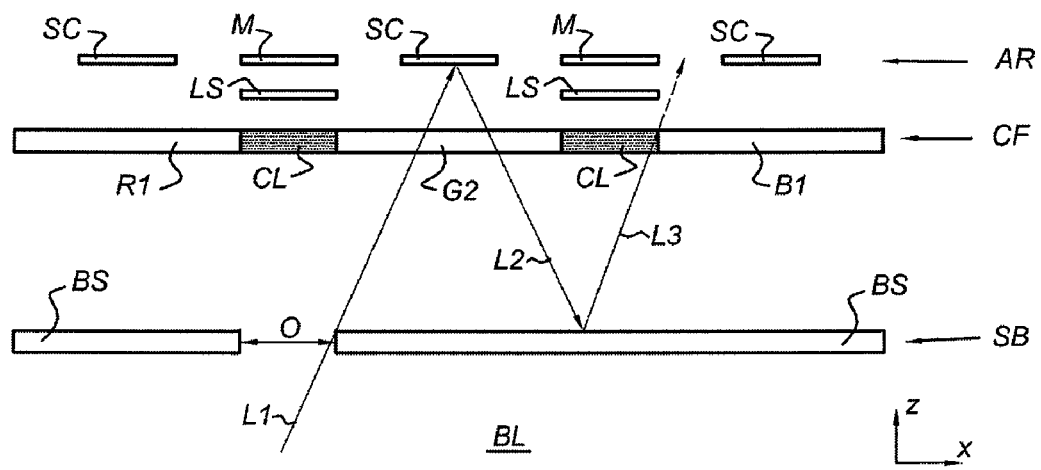
FIGS. 5 and 6 show a cross-section of a part of an embodiment of a Dual View display.

FIG. 5 shows a cross-section of a part of a Dual View display according to an embodiment of the present invention. The dual view display according to this embodiment is arranged with a color filter layout on the color filter plate CF. The color filter layout comprises intermediate light blocking elements CL that are arranged intermediate adjacent color elements. The intermediate light blocking elements CL are located, in the Z-direction substantially perpendicular below the metal connection lines M and/or the light shields LS. Note that the exact location of the light blocking elements on the color filter plate may depend on the position of the array metal on the array plate AR.

The intermediate light blocking elements are designed to block impinging light by means of absorption. The light blocking elements may include of a light absorbing polymer, for example, carbon resin or black resin. Alternatively, the light blocking elements may include metal or metal oxide with relatively high absorption.

The intermediate light blocking elements CL may be designed to have substantially a same shape as the light shield LS and/or the metal connection line M. The intermediate light blocking elements CL also are designed to have a size that is sufficient to substantially block light from reflecting on the light shield LS and/or the metal connection line M. In practice, depending on the design of the display, the size of the intermediate light blocking elements can thus be either smaller, equal or larger than a size of the light shield LS and/or the metal connection line M in the horizontal direction X and/or in the vertical direction Y (see FIG. 3).

In the example of FIG. 5, red color element R1 is separated from the adjacent green color element G2 by one intermediate light blocking element CL. Likewise, green color element G2 is separated from the adjacent blue color element B1 by another intermediate light blocking element CL.

Above each color element R1, G2, B1, the driving components of the TFT circuit for the LC layer element associated with the respective color element are schematically indicated by the storage capacitor SC. As shown, the optical path L1-L2-L3 is effectively interrupted by the intermediate light blocking element CL. The light ray L1 that passes the green color element G2 as first color element, is reflected as reflected light ray L2 on the surface of a metallic driver component for example, the storage capacitor SC. The reflected light ray L2 passes the green color element G2 for a second time and impinges on the single barrier layer SB (or its interface with the color filter plate CF). Next, the light is reflected by the blocking structure BS of the single barrier SB as second reflected light ray L3 in a direction away from the backlight BL.

Due to the design of the color filter layout on the color filter plate, the second reflected light ray L3 impinges on the intermediate light blocking element CL intermediate the green color element G2 and the blue color element B1. The intermediate light blocking element CL prevents the light ray L3 from propagating further. In other words, the intermediate light blocking element blocks light reflected in one view (in the green color element G2 of the second view) before entering the other view (in the blue color element B1 of the first view). Advantageously, the intermediate light blocking elements CL also can reduce the effect of element misfit D (element gaps or element overlay).

Figure 6:
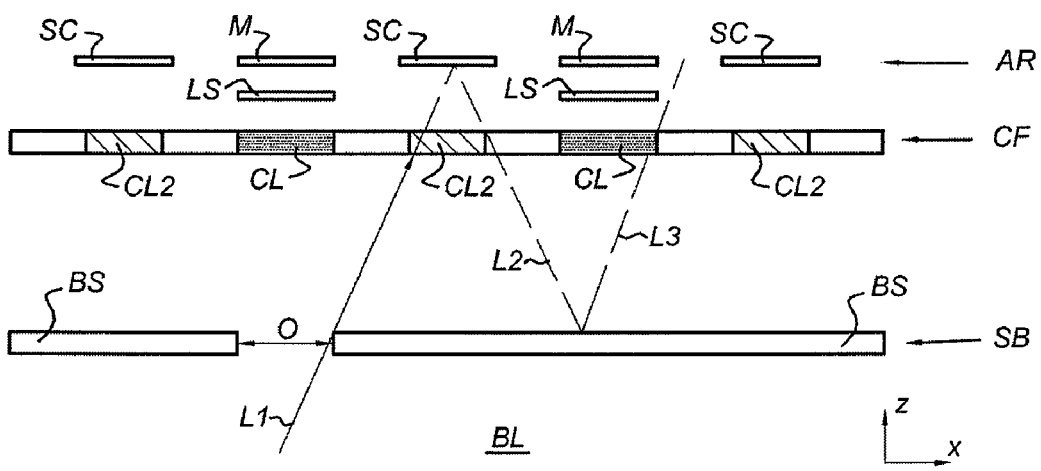

FIG. 6 shows a cross-section of a part of a Dual View display according to a further embodiment of the present invention. In FIG. 6, entities with the same reference numbers as shown in the proceeding figures refer to the corresponding entities in the preceding figures.

In this embodiment, the color filter layout comprises intermediate light blocking elements CL between adjacent color elements (as described above) and intra light blocking elements CL2 inside a color element (sub-pixel). The intra light blocking elements CL2 are arranged to prevent that light, which would pass through a section of a color element so as to cause cross-talk by internal reflection, to reflect on a surface of one of the driver components, such as the storage capacitor, or the gate line.

The section of the intra light blocking element CL2 is positioned in a color element in such a way that the light rays coming from the backlight BL that could reach the surface of one of the driver components are blocked at the level of the color filter plate. In this manner, the first reflection of the light ray L1 after passing the first color element is prevented. The blocked portion of the optical path L1-L2-L3 is indicated by dashed lines.

The intra light blocking element CL2 effectively blocks light that reflects on array metal within a color element of one view (in this case within the green color element G2 of the second view). This also prevents the reflected light from passing the same element again and subsequently reaching the adjacent color element (in this example, the blue color element B1 of the first view).

In one embodiment, the intra light blocking elements CL2 are designed to have substantially the same shape as the corresponding driver component. Also, the intra light blocking elements CL2 are designed to have substantially a size that is sufficient to substantially block light from reflecting on the respective driver component. In practice, depending on the design of the display, the size of the intermediate light blocking elements can thus be either smaller, equal or larger than a size of the corresponding driver component in the horizontal direction X and/or in the vertical direction Y (see FIG. 3).

Figure 7:
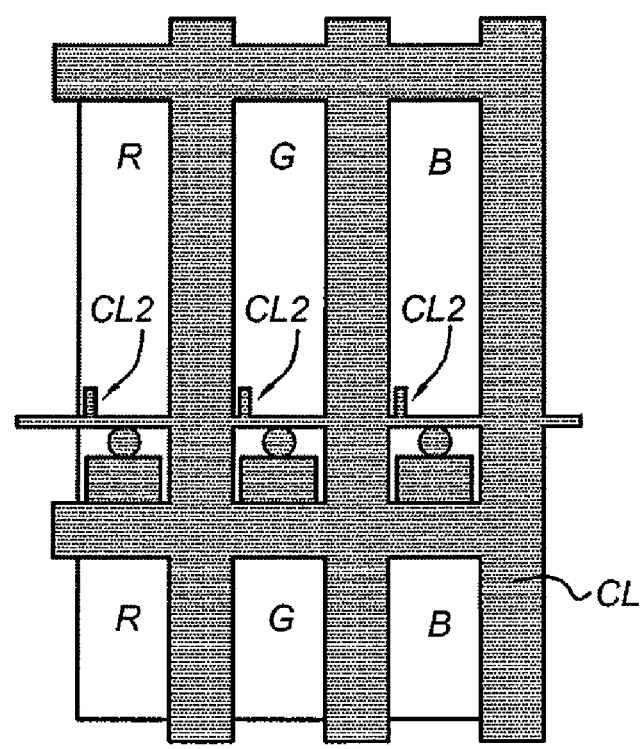
FIG. 7 shows a detailed top view of an embodiment of a thin film driver circuit.

FIG. 7 depicts a top view of a color filter plate CF comprising a color filter layout in accordance with a further embodiment of the present invention. As shown in FIG. 7, the color elements R, G, B are arranged in color stripes extending in the vertical direction Y. At the locations coinciding with the (projected) locations of the horizontal and vertical metal connection lines in the array plate AR, the intermediate light blocking elements CL are located. At the locations coinciding with the (projected) locations of the driver components in the array plate AR, the intra light blocking elements CL2 are located.

It is noted that application of an intra light blocking element inside a color element does not affect the transmission of that color element. The driver components on the array plate above the intra light blocking elements CL2 do not transmit light either. Furthermore, it is noted that the single barrier SB applied here as rear barrier close to the backlight BL could also have been arranged as front barrier at the viewing surface of the display. However, the use of a front barrier may have the disadvantage that no recycling of light from the backlight is possible. By using a rear barrier SB, the surface of the blocking structures BS facing the backlight BL can be provided with a reflecting layer so as to reflect light that impinges on the blocking structures BS back to (the reflector of) the backlight BL. In this manner, the light output of the display can be enhanced. As a result, power consumption by the backlight can be reduced.

In a further embodiment, the Dual View display device of the present invention may be arranged as a switchable display device using barrier technology to create 2D (two-dimensional) images in one mode and 3D (three-dimensional) images in another mode, the modes being switchable by a mechanism, such as one known in the art. In the 3D imaging mode, the Dual View of the first view V1 and the second view V2 can be generated. In the 3D mode, the first view V1 is for example intended for viewing by the left eye, and the second view V2 by the right eye of an observer.

Moreover, it is noted that in some embodiments, the color filter plate may comprise at least one additional color element next to the red, green and blue color elements, for example, a white sub-pixel next to the red, green and blue color elements. Also, the color filter plate may exhibit a color element arrangement different from a color stripe arrangement.

In a further embodiment (not shown), the dual display device comprises an array of organic light emitting diodes (OLEDs) as a light source. The display device further comprises a color filter plate and a single barrier plate as discussed above. Additionally, the display device may comprise one or more polarizers.

The individual LED elements are coupled to an array plate that comprises array metals relating to at least metal interconnection lines M, driving components and TFT driver circuits. Typically, the LED elements are each arranged to produce an individual light beam and can be addressed individually as a sub-pixel.

In this embodiment, each LED element is arranged for emission of 'white light' (i.e., an ensemble of light components with various wavelengths that produces at least a perception of white light) which may pass through the color filter CF.

The color filter comprises intermediate light blocking elements CL and intra light blocking elements CL2 which are arranged for preventing that light emitted from the LEDs and that is associated with one view, is transmitted by means of reflection on a portion of the array metals in the direction of the other view. The light blocking elements block the optical path of such reflected light. Thus, cross-talk is prevented in a similar manner as described for the embodiments comprising a backlight BL.

While specific embodiments of the invention have been described above, it will be appreciated that the invention may be practiced otherwise than as described. The descriptions above are intended to be illustrative, not limiting. It will be apparent to one skilled in the art that modifications may be made to the invention as described without departing from the spirit and scope of the claims set out below.

The invention claimed is:

1. Display device for displaying a first view (V1) and a second view (V2), the first view and the second view having a first and second horizontal viewing angle, respectively; the display device comprising:
a color generating layer (CF), a barrier layer (SB), an array layer (AR) and a light source, wherein the color generating layer is arranged between the barrier layer and the array layer, and the barrier layer is arranged between the color generating layer and the light source;
the color generating layer comprising a plurality of color elements arranged in a two-dimensional array extending in a plurality of rows in a horizontal direction (X) and a plurality of columns in a vertical direction (Y);

the light source being arranged such that, during use, light generated by the light source may pass through an arrangement of at least the barrier layer and the color elements of the color generating layer;

the array layer comprising array metal circuitry, provided as a projection covering a portion of each color element;

the color generating layer comprising light blocking elements for preventing light generated for one of the first and second views from being transmitted by reflection by at least a portion of a surface of the array metal circuitry in a direction of the other of the first and second views, wherein the array metal circuitry comprises metal connection lines (M) and light shields (LS), the light shields (LS) are disposed between the metal connection lines (M) and the light blocking elements (CL), and the light blocking elements (CL) are arranged between adjacent color elements for preventing light reflecting on the metal connection lines (M) and the light shields (LS).

2. Display device according to claim 1, wherein the light blocking elements (CL) have substantially a same shape as the light shield (LS) and/or the metal connection line (M) in at least one of the horizontal direction (X) and the vertical direction (Y).

3. Display device according to claim 1, wherein the light blocking elements (CL2) are arranged in a section inside a color element for preventing light reflecting on a portion of the array metal circuitry.

4. Display device according to claim 3, wherein the light blocking elements (CL2) in the section inside the color element have substantially a shape corresponding to a shape of the array metal circuitry.

5. Display device according to claim 3, wherein the light blocking elements (CL2) in the section inside the color element have substantially a size at least equal to a size of the shape of the portion of array metal circuitry in at least one of the horizontal direction (X) and the vertical direction (Y).

6. Display device according to claim 1, wherein the light source is a backlight.

7. Display device according to claim 1, wherein the light source is an array of light emitting diodes.

8. Display device according to claim 6, wherein the barrier layer comprises a reflector layer on a surface facing the backlight.

9. Display device according to claim 1, wherein the color elements comprise at least red, green and blue color elements.

10. Display device according to claim 9, wherein the color generating layer further comprises color elements of at least one additional color.

11. Display device according to claim 1, wherein the barrier layer comprises a barrier pattern of blocking structures (BS) and openings (O) extending in the horizontal and vertical directions, being arranged for providing the viewing angle of the first view and the viewing angle of the second view.

12. Display device according to claim 1, wherein a light-switching layer is arranged between the array layer and the color filter layer, and the light switching layer comprises light switching elements that are each individually associated with one single color element of the plurality of color elements for controlling a transmission of light, during use, through that single color element; each light switching element being connected to the array metal circuitry.

13. Display device according to claim 12, wherein the light switching elements are arranged for assigning one half of the plurality of color elements to the first view (V1) and another half of the plurality of color elements to the second view (V2).

14. Display device according to claim 1, wherein the display device is capable of generating images in a three-dimensional mode, the first view (V1) being associated with a view for one eye of an observer, the second view (V2) being associated with a view for the other eye of the observer.

15. Display device according to claim 14, wherein the display device is switchable between the three-dimensional mode and a two-dimensional mode.

16. Display device for displaying a first view (V1) and a second view (V2), the first view and the second view having a first and second horizontal viewing angle, respectively; the display device comprising:

a color generating layer (CF) and an array layer (AR), wherein the color generating layer is arranged under the array layer;

the color generating layer comprising a plurality of color elements arranged in a two-dimensional array extending in a plurality of rows in a horizontal direction (X) and a plurality of columns in a vertical direction (Y);

the array layer comprising array metal circuitry covering a portion of each of the color elements;

the color generating layer comprising means for preventing light generated for one of the first and second views from being transmitted by reflection by at least a portion of a surface of the array metal circuitry in a direction of the other of the first and second views, wherein the array metal circuitry comprises metal connection lines (M) and light shields (LS), the light shields (LS) are disposed between the metal connection lines (M) and the means of the color generating layer, and the means of the color generating layer is arranged between adjacent color elements for preventing light reflecting on the metal connection lines (M) and the light shields (LS).

17. Display device according to claim 16, further comprising a barrier layer having a barrier pattern of blocking structures (BS) and openings (O) extending in the horizontal and vertical directions, the barrier layer being operative to provide the viewing angle of the first view and the viewing angle of the second view.

18. Display device according to claim 16, further comprising means for providing the viewing angle of the first view and the viewing angle of the second view.

* * * * *